United States Patent [19]
Inbar et al.

[11] Patent Number: 5,835,173
[45] Date of Patent: Nov. 10, 1998

[54] TRANSPARENCY VIEWING DEVICE COMPRISING PASSIVE MATRIX LCD

[75] Inventors: Dan Inbar; Hanan Wolf, both of Haifa; Benzion Levi, Kiyat Yam, all of Israel

[73] Assignee: Smartlight Ltd, Haifa, Israel

[21] Appl. No.: 654,277

[22] Filed: May 28, 1996

Related U.S. Application Data

[63] Continuation of Ser. No. 648,007, filed as PCT/EP94/03968, Nov. 28, 1994.

[30] Foreign Application Priority Data

| Nov. 28, 1993 | [IL] | Israel | 107.782 |
| Dec. 15, 1993 | [IL] | Israel | 108.037 |
| Dec. 15, 1993 | [IL] | Israel | 108.038 |

[51] Int. Cl.$^6$ .............................................. G02F 1/1335
[52] U.S. Cl. .............................. 349/61; 40/361; 345/102
[58] Field of Search ............................ 349/61; 40/361, 40/363; 345/102, 77

[56] References Cited

U.S. PATENT DOCUMENTS

| 1,988,654 | 1/1935 | Haag . |
| 2,436,162 | 2/1948 | Cadenas . |
| 2,516,270 | 7/1950 | Swain . |
| 2,754,605 | 7/1956 | Berkeley . |
| 3,246,412 | 4/1966 | Sommerhoff . |
| 3,322,485 | 5/1967 | Williams . |
| 3,492,486 | 1/1970 | Bischoff et al. . |
| 3,714,413 | 1/1973 | Craig . |
| 4,004,360 | 1/1977 | Hammond . |
| 4,118,654 | 10/1978 | Ohta et al. . |
| 4,335,936 | 6/1982 | Nonomura et al. . |
| 4,368,467 | 1/1983 | Unotoro et al. . |
| 4,373,280 | 2/1983 | Armfield, III . |
| 4,378,557 | 3/1983 | Murata . |
| 4,403,832 | 9/1983 | Tanaka et al. . |

(List continued on next page.)

FOREIGN PATENT DOCUMENTS

| 0035382 | 9/1981 | European Pat. Off. . |
| 0165548 | 12/1985 | European Pat. Off. . |
| 0253379 | 1/1988 | European Pat. Off. . |
| 0352101 | 1/1990 | European Pat. Off. . |
| 0412757 | 2/1991 | European Pat. Off. . |
| 0436267 | 7/1991 | European Pat. Off. . |
| 2559923 | 8/1985 | France . |
| 1961126 | 7/1970 | Germany . |
| 3331762 | 3/1985 | Germany . |
| 9010889 | 1/1991 | Germany . |
| 3933988 | 4/1991 | Germany . |
| 6484141 | 3/1989 | Japan . |
| 2050032 | 12/1980 | United Kingdom . |
| 2062930 | 5/1981 | United Kingdom . |
| 8903064 | 4/1989 | WIPO . |
| 9006537 | 6/1990 | WIPO . |
| 9110152 | 7/1991 | WIPO . |
| 9301564 | 1/1993 | WIPO . |

OTHER PUBLICATIONS

Patent Abstracts of Japan, vol. 16, No. 562 (P–1456). Aug. 1992.

J. Nehring, IEEE Transactions on Electron Devices, vol. 26, No. 5, May 1979, New York, US, pp. 795–802, "Ultimate Limits for Matrix Addressing . . . ".

(List continued on next page.)

*Primary Examiner*—William L. Sikes
*Assistant Examiner*—James A. Dudel
*Attorney, Agent, or Firm*—Greenblum & Bernstein P.L.C.

[57] ABSTRACT

A transparency viewing device including a faceplate adapted for mounting at least one transparency thereon, an LCD array having a given chromaticity underlying the faceplate, a source of backlighting for the LCD array having a variable chromaticity and a controller which controls the chromaticity of the backlighting source based on the chromaticity of the light passing through the film and the LCA.

44 Claims, 10 Drawing Sheets

U.S. PATENT DOCUMENTS

| | | |
|---|---|---|
| 4,448,490 | 5/1984 | Shibuya et al. . |
| 4,454,904 | 6/1984 | Oxman . |
| 4,510,708 | 4/1985 | Pokrinchak . |
| 4,637,150 | 1/1987 | Geluk . |
| 4,707,080 | 11/1987 | Fergason . |
| 4,760,389 | 7/1988 | Aoki et al. ................................. 349/61 |
| 4,775,918 | 10/1988 | Snyder . |
| 4,799,083 | 1/1989 | Knodt . |
| 4,833,542 | 5/1989 | Hara et al. . |
| 4,850,675 | 7/1989 | Hatanaka et al. . |
| 4,855,725 | 8/1989 | Fernandez . |
| 4,859,037 | 8/1989 | Iwashita et al. . |
| 4,901,155 | 2/1990 | Hara et al. . |
| 4,908,876 | 3/1990 | DeForest et al. . |
| 4,917,465 | 4/1990 | Conner et al. . |
| 4,952,036 | 8/1990 | Gulick et al. . |
| 4,966,441 | 10/1990 | Conner . |
| 4,977,315 | 12/1990 | Purcell . |
| 4,983,956 | 1/1991 | Salam . |
| 4,996,786 | 3/1991 | Shoenfeld ................................. 40/361 |
| 5,122,791 | 6/1992 | Gibbons et al. ......................... 340/784 |
| 5,124,818 | 6/1992 | Conner et al. . |
| 5,155,608 | 10/1992 | Hatano . |
| 5,159,363 | 10/1992 | Brauning . |
| 5,283,632 | 2/1994 | Suzuki et al. ............................ 348/223 |
| 5,313,726 | 5/1994 | Yaniv et al. . |
| 5,363,223 | 11/1994 | Beesley ...................................... 349/61 |
| 5,384,577 | 1/1995 | McLaughlin et al. ..................... 349/61 |
| 5,406,305 | 4/1995 | Shimomura et al. .................... 345/102 |
| 5,430,964 | 7/1995 | Inbar et al. . |
| 5,491,332 | 2/1996 | Inbar et al. . |

OTHER PUBLICATIONS

T.N. Ruckmongathan, Conference Record of the 1988 International Display Research Conference, Oct. 1988, pp. 80–85, "A Generalized Addressing Technique for RMS Responding Matrix LCD".

H. Hamada, SID 1992, pp. 269–272, "Brightness Enhancement of an LCD Projector by a Plana Mcrolens Array".

IBM Technical Disclosure Bulletin, vol. 33, No. 9, Feb. 1991, New York, US, pp. 261–262, "High Efficiency Backlight for LCD".

Patent Abstract of Japan, vol. 13, No. 314 (P899). Jul. 1989.

Patent Abstract of Japan, vol. 17, No. 464 (P1599). Aug. 1993.

Jameson et al., "Visual Psychophysics", pp. VII, VIII, 43–49,54 and 78–101, 1972.

E. Kaneko, "Liquid Crystal TV Displays: Principles and Applications of Liquid Crystal Displays", pp. 77–137, 1987.

T.N. Ruckmongathan et al., Japan Display 1992, "S3–4 New Addressing Technique for Fast Responding STN LCDs", pp. 65–68. 1992.

K. Tarumi et al. Japan Display 1992, "S15–5 On the Relationship between the Material Parameters and the Switching Dynamics in Twisted Nematic Liquid Crystals", pp. 587–590.

P.M. Alt et al., IEEE "Transactions on Electron Devices" vol. ED–21, No. 2, Feb. 1974, pp. 146–155.

Patent Abstracts of Japan, vol. 10, No. 206 (P–478). Jul. 1986.

Patent Abstracts of Japan, vol. 17, No. 387 (P–1576). Mar. 1993.

D.P. Carmody et al., "Global and Segmented Search for Lung Nodules of Different Edge Gradients", Investigative Radiology, May–Jun. 1980, vol. 15, No. 3, pp. 224–233.

Abilgaard et al., "Increasing Contrast When Viewing Radiographic Images", Radiology, vol. 185, pp. 475–478, 1992.

Werner E. Haas, *Liquid Crystal Display Research*: The First Fifteen Years, Vol. Cryst. and Liq. Crys, vol. 94, pp. 1–31 (1983).

*Liquid Crystals, Nature's Delicate Phase of Matter*, by Peter J. Collings, Princeton University Press, 1990, Chapter 2, pp. 24–34.

Stephen Balter, et al., *Radiographic Viewing Conditions*, published in the conference proceedings of "Application of Optical Instrumentation in Medicine, 2nd Seminar," SPIE, 29–30 Nov. 1973 pp. 225–227.

J. Blair Hartley, *Film Viewing*1996, (Ro–B1 20, Yr. Feb. 1967), pp. 96 and 97.

Gerd Rosenbusch, *Radiology in Medical Diagnostics*, 1994, p. 465.

*Physiologishe Problems der Betrachtung des Rontgenbildes* (Psychological Problems in Viewing Radiograph) by Rainer Rohler, dated Feb. 1967, pp. 79 and 86–96 and English translation titled "Physiological Problems of Reading of Radiographs" (Ro–B1, 20 Yr. Feb. 1967).

FIG. 3
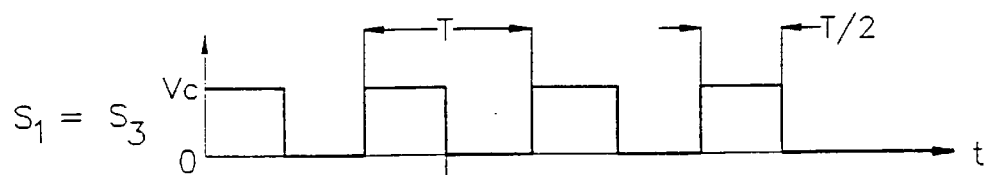
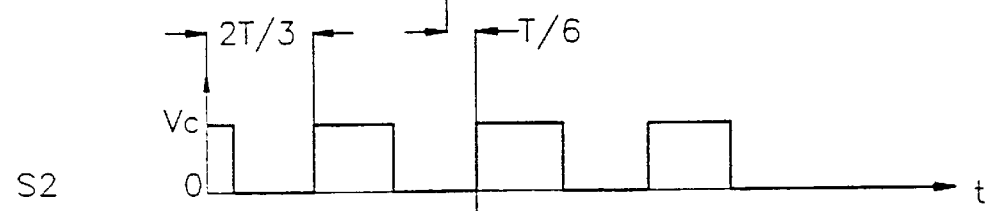
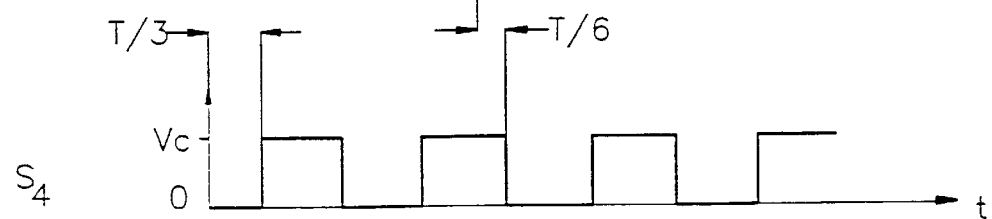
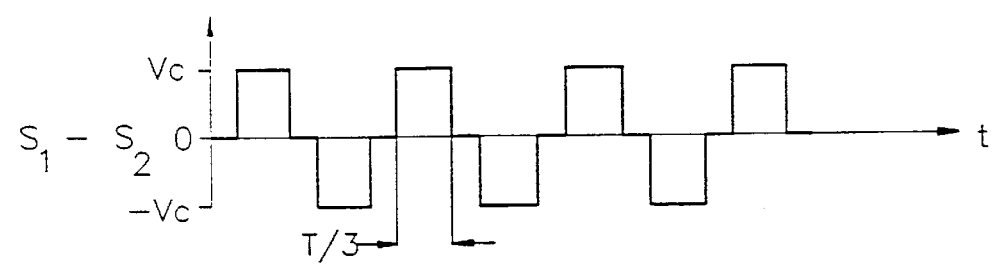
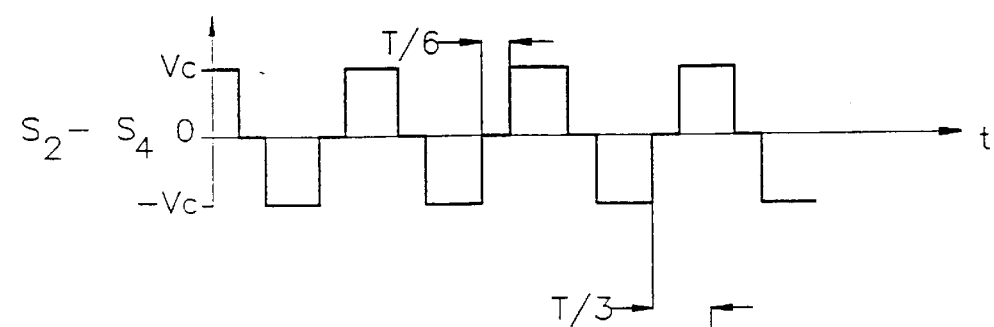
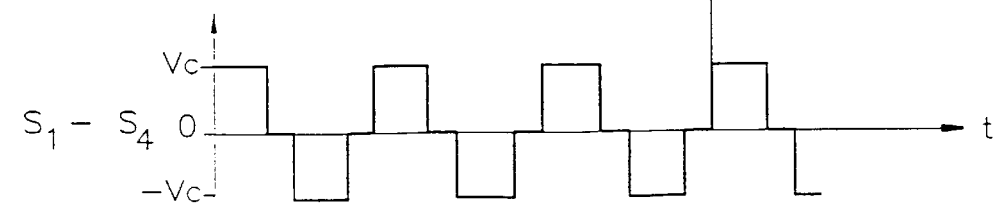

FIG. 5
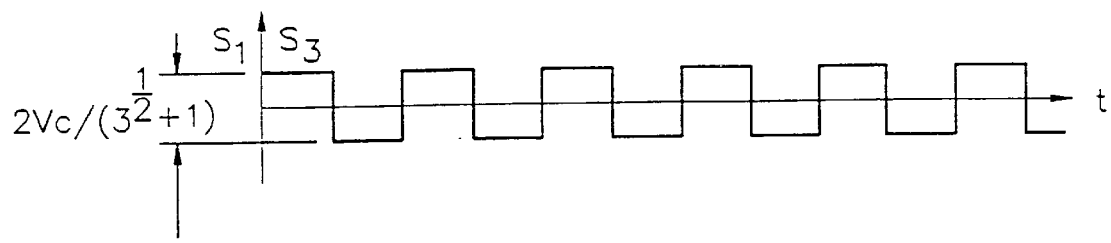
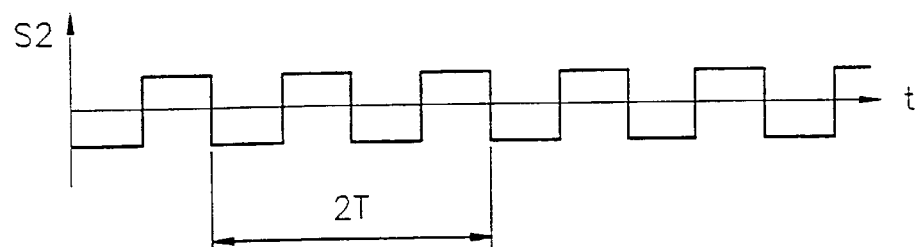
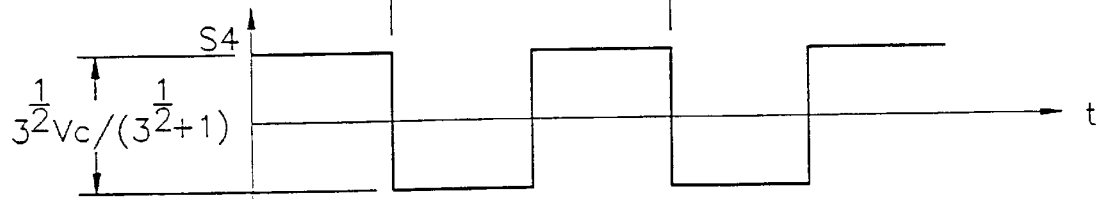
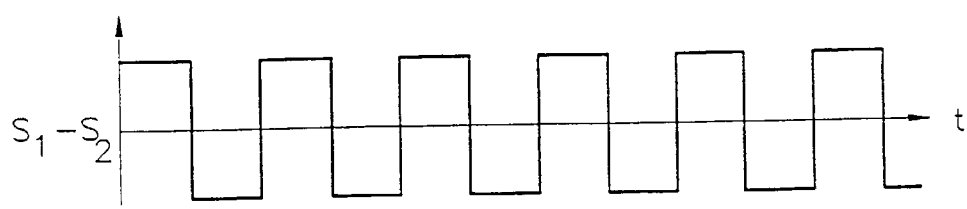
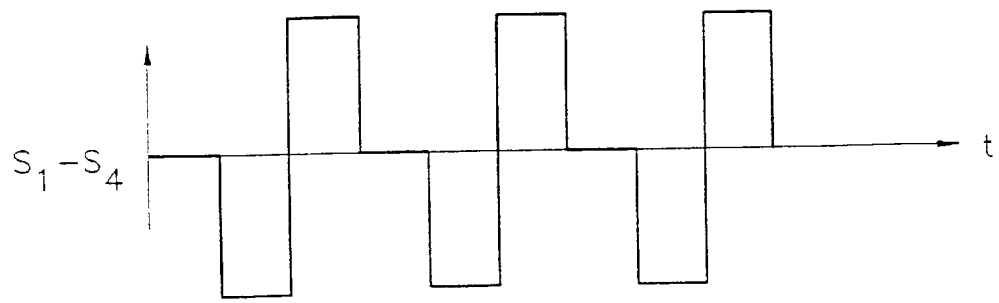

TRANSPARENCY VIEWING DEVICE COMPRISING PASSIVE MATRIX LCD

RELATED APPLICATION

This application is a continuation of U.S. patent application Ser. No. 08/648,007 filed May 24, 1996, which is the U.S. National filing of PCT/EP94/03968, which was filed in the PCT on Nov. 28, 1994.

FIELD OF THE INVENTION

This invention is generally related to the field of transparency viewing apparatus, and more specifically to the field of transparency viewing apparatus using a liquid crystal array display surface.

BACKGROUND OF THE INVENTION

The use of liquid crystal arrays (LCA) as the display surface for a transparency has been mooted in the past. Such systems, in order to be optimally effective, require that the portion of the array which underlies the transparency has sufficient brightness to enable viewing of the image and that the contrast ratio between the bright and dark portions of the array (namely the area outside the transparency or an image region of the transparency) be high.

The use of active matrix, passive matrix and direct drive technologies for LCAs has been described. These technologies, as they are used in the art, have substantial drawbacks when applied to a transparency viewer. Active matrix arrays have the drawback of high cost for the array because of the additional process steps required for the active elements and the difficulty in achieving large size arrays due to the limitations of semiconductor thin film technology.

Direct addressing systems have large spacings between the elements for the passage of the large number of conductors needed for this system thus reducing the contrast of the system. The large number of drivers required increases the cost of the associated electronics especially for large arrays.

Passive matrix systems suffer from much lower contrast than active matrix systems due to the scanning limitations of the multiplex drive systems which are generally required for such systems. This is especially true when a number of different areas are bright and dark in systems which have the flexibility to provide a large number of such areas. On the other hand, passive matrix systems are much more available and cheaper, both for the arrays themselves (compared to active matrix systems) and for the associated electronics (compared to direct addressing systems). However, while such systems do have smaller inactive stripes between the LCA elements than the direct addressing matrix LCAs, even these stripes can be troublesome to the viewer.

Another problem with LCA viewers is caused by the fact that the contrast of LCAs is a strong function of the angle of incidence of the light which illuminates the LCA, with maximum contrast being available for near normal incidence. Since back illumination is by its nature relatively isotropic, the contrast of the viewing surface is further degraded.

SUMMARY OF THE INVENTION

The present invention seeks, in one aspect thereof, to overcome some of the limitations of the prior art by utilizing a passive LCA and by driving the array in a novel manner which takes account of the nature and shame of the types of transparencies which are to be viewed on a transparency viewer.

The invention is especially suitable for the viewing of medical images, such as X-Ray films or films which are produced by hardcopy devices associated with digital medical imaging equipment such as computerized tomographs, gamma cameras, medical ultrasound imagers, digital subtraction angiography equipment or digital radiography equipment.

In particular, this aspect of the invention is based an the realization that, in general, at a given time, only one or two sizes of film are viewed and that this allows for both an extreme simplification of the system electronics and a large increase in the available contrast ratio (between bright and dark masked areas of the viewer surface) of the system.

Unlike most LCA systems, which require great flexibility for the placement and size of bright and dark areas, medical imaging systems require only a relatively limited number of relatively large bright regions on a dark background. Furthermore, the bright regions, even when they are not contiguous, are normally of the same height and require that the same rows of the array be off (i.e., bright) for all the columns which are partly covered by the transparencies. The present inventors have determined that this configuration corresponds to a reduced set of a two by two grouping of rows and columns (two groups of identical rows and two groups of identical columns).

Using conventional electronics, this fact would not provide a substantial improvement in operation. In fact, a paper by Nehring and Kmetz entitled "Ultimate Limits for Matrix Addressing of RMS-Responding Liquid-Crystal Displays" (*IEEE Transactions on Electron Devices*, Vol. ED-26, No. 5, May 1979) proves that the maximum ratio of the voltages across the on and off elements that is achievable for the general two by two matrix is 3:1. This results in contrast which is not optimal for viewing medical transparencies. However, the present inventors have found that, for the case described above, row and column groupings in accordance with the invention result in as few as three driver signals being required for the system. Furthermore, an optimal drive voltage which results in maximum contrast, without LC drive signal overvoltage anywhere in the system, can be applied by selection of an appropriate time (or phase) shift between the driver signals by appropriate selection of the signal voltages and/or frequencies, or by appropriate combinations of these variables. Application of these optimal signals to the groups of rows and columns results in an infinite voltage ratio and the maximum contrast which is theoretically achievable by the elements of the array.

In a preferred embodiment of the invention rows and columns of the LCA are each formed into two groups, a first group of rows (or columns) which contains all those rows (or columns) which have both on and oat elements and a second group comprising all rows (or columns) for which all of the elements are on (i.e., non-transmitting). The rows and columns in a given group are not necessarily contiguous.

In a preferred embodiment of the invention, the first group of columns is driven by a signal $S_1$ and the second group is driven by a signal $S_2$. The first group of rows is driven by a signal $S_3$ which is the same as $S_1$, and the second group of rows is driven by a signal $S_4$. Preferably, each of the signals is a square wave having a relatively arbitrary period T and voltage levels of zero volts and $V_c$, the maximum allowable array voltage. $S_2$ is preferably delayed with respect to $S_1$ by a time 2T/3 and $S_4$ is preferably delayed by T/3 with respect to $S_1$ This arrangement results in the "bright" areas being subjected to zero voltage and the dark areas being subjected to an alternating stepped voltage having a peak value equal to the peak value of the driver signals and an RMS value of $(2/3)^{1/2}V_c$).

In a second preferred embodiment of the invention, three of the voltages are square waves having a period T and a peak value of $2V_c/(3^{1/2}+1)$, with $S_1$ and $S_3$ being the same and $S_2$ being delayed by T/2 with respect to the other voltages. $S_4$ can have one of three forms, in each case being a square wave having a voltage equal to $3^{1/2}V_c/(3^{1/2}+1)$. In one case the period of the square wave is T*2M (where M is an integer). In a second case it is equal to T/2M (where M is an integer). In both these cases, a rising edge of this signal coincides with either a failing or a rising edge of the signal $S_1$. In a third case the period is T, but $S_4$ is delayed by T/4 compared with $S_1$. In this second embodiment the rms voltage on the individual elements is $2V_c/(3^{1/2}+1)$.

The same driving systems can be used for other configurations of dark and light areas which also represent commonly encountered configurations. One example of such a configuration is a multi-imager a-ray of n=images on a single transparency as is normally produced to show the results of a gamma camera study or an ultrasound study. In such studies, a film in often provided with images arranged in an array, the images being separated by unexposed (clear) film. Several of such films can be placed side by side, which would result in a larger array of films. The only requirement for the application of this aspect of the invention is that it be possible to group the rows (and columns) into two groups where all the elements of one group do not include an image and a second group where all the elements of the group have identical configurations of image and non-image portions.

In a second aspect of the invention, two layers of LCD are used to improve the contrast between the bright and dark areas. The use of two layers of LCD to improve contrast has been reported previously. However, in a preferred embodiment of the invention, advantage is taken of the fact that the contrast reduction of LCA elements is not generally symmetrical about normal incidence and that generally contrast falls off in first angular direction faster than in a second symmetrically opposed angular direction. In a preferred embodiment of the invention, the two arrays are configured with the respective first angular direction of one array aligned with the second angular direction of the second array. This configuration is conveniently accomplished by turning over one of the arrays with respect to the other. This configuration results in higher contrast over a wider viewing angle for the two layer system than would have occurred had the arrays been aligned in the same direction.

Additionally, in a preferred embodiment of the invention, the two LCAs are offset both horizontally and/or vertically, by a fraction of an array element, for example, by half an element of the array. Using an offset configuration reduces the stripe effect noted above to a series of small bright points in the dark areas, which results in an improved contrast between bright and dark areas. This is much less objectionable than a grid of lines. The objectional effect can be further reduced by using a diffuser.

Further, in a preferred embodiment of the invention, only three polarizers are used in the double layer LCA, with (for example, for a normally clear twisted nematic LCA) one polarizer each of the outer faces of the double LCA having a first direction of polarization, and a single polarizer between the two layers, having a polarization of 90° with respect to the other polarizers. This is in contrast to the prior art situation in which two polarizers are associated with each LC array. Removal of one polarizer improves the chromatic characteristics of the array and reduces the light attenuation of the array. In general, if n LCA layers are used, n+l polarizers are required.

In a further aspect of the invention, a camera, preferably a camera, is used to image the front of the transparency viewer and to determine the shape of the portion of a film an the viewer which is not transparent. In this aspect of the invention, the horizontal and vertical extents of this portion of the film are determined and used to control which rows and columns should belong to the first and second groups.

One problem with such a system is that the entire viewing surface must be lit during the time that the image is acquired by the camera. This causes glare to the user, especially if the system is used in a dark room. Furthermore, the camera must be placed so that it views the transparencies practically perpendicularly.

In a preferred embodiment of the invention, a Brightness Enhancement Film (BEF) such as is available from Minnesota Mining and Manufacturing Company is placed between the backlighting and the LCA. This film has the property that it accepts light from many directions on one side of the film and transmits the light through to the other side of the film mostly in a relatively small conical angle of about 35° about the normal. In addition, a sidelobe of light is transmitted at about 70° to the normal. In a preferred embodiment of the invention, the camera is placed at the sidelobe angle. It should be understood that, when the array is in the off state, the off state is most effective at the normal and is much less effective at the sidelobe angle. Thus, when the LCAs are in the off state, the operator, who views the surface from a generally normal direction, sees a black surface. However, the camera receives some light since the off state is much less effective at the sidelobe angle and a CCD camera can acquire an image of the front of the viewer. This configuration allows for the determination of the extent of the image on the film while the LCA is turned off.

In a further aspect of the invention, compensation is provided for the chromaticity of the LCA layers. In particular, the LCA layers selectively attenuate blue light compared to other parts of the spectra. While this absorption is generally not serious for other uses of LCAs, viewers for medical films generally require light having an equivalent temperature of preferably above 5000° K. and more preferably about 6500° K. In one preferred embodiment of the invention, light sources having a complementary spectrum to the absorption of the LCAs is used. In a second preferred embodiment, absorbers such as color filters are used or the surfaces of the backlighting structure are painted blue or some other compensating (selectively absorbing) color. in a third preferred embodiment of the invention, one or more complementary light sources are used together with white lamps in the backlighting system. The light of all the lamps is mixed before illuminating the surface of the viewer.

One problem which arises in the use of LCAs for medical imaging is that LCA panels are generally available in sizes of 14" by 14" while medical imaging films may be as large as 14" by 17". Such large films are generally viewed in portrait position, i.e., with the long side vertical.

In a preferred embodiment of the invention, a 14" by 14" panel is jointed with a 14" by 3" panel, with the small panel being joined to the lower edge of the larger panel. Joining such panels would result in unacceptable artifacts for most uses; however, for viewing medical images, an acceptable seam can be achieved by selective increase in diffusion of the light at the seam.

The invention will be more clearly understood from the following description of preferred embodiments thereof in conjunction with the following drawings which:

BRIEF DESCRIPTION OF THE DRAWINGS

FIG. 3 shows the waveforms of voltages which are applied to groups of rows and columns and to the elements of an LCA in accordance with one preferred embodiment of the invention;

FIG. 5 shows the waveforms of voltages which are applied to groups of rows and columns and to the elements ao an LCA in accordance with a third preferred embodiment of the invention;

DESCRIPTION OF THE PREFERRED EMBODIMENTS OF THE INVENTION

Figure 1:
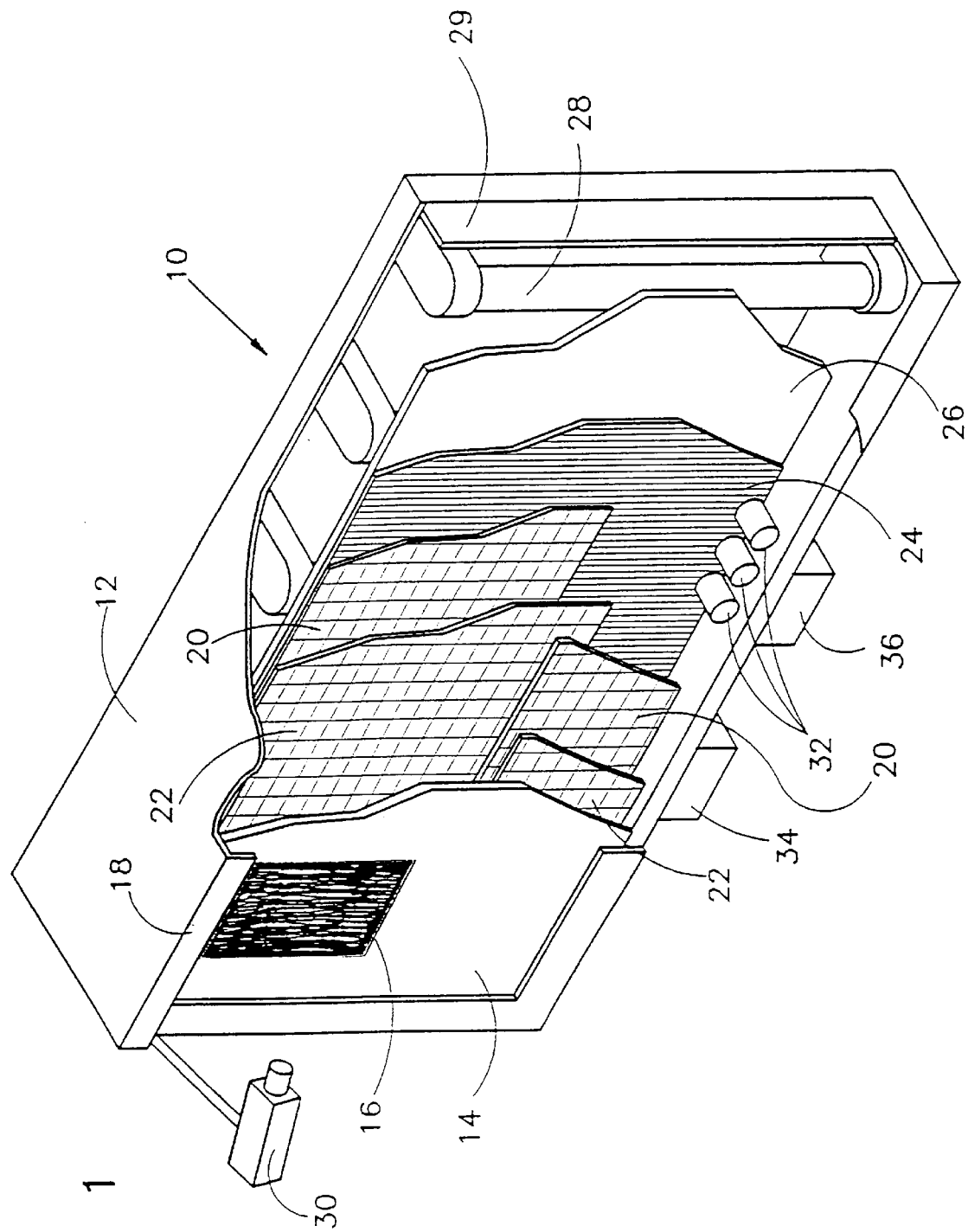
FIG. 1 is a partial cut-away perspective illustration of a viewing apparatus in accordance with a preferred embodiment of the invention.
Figure 2:
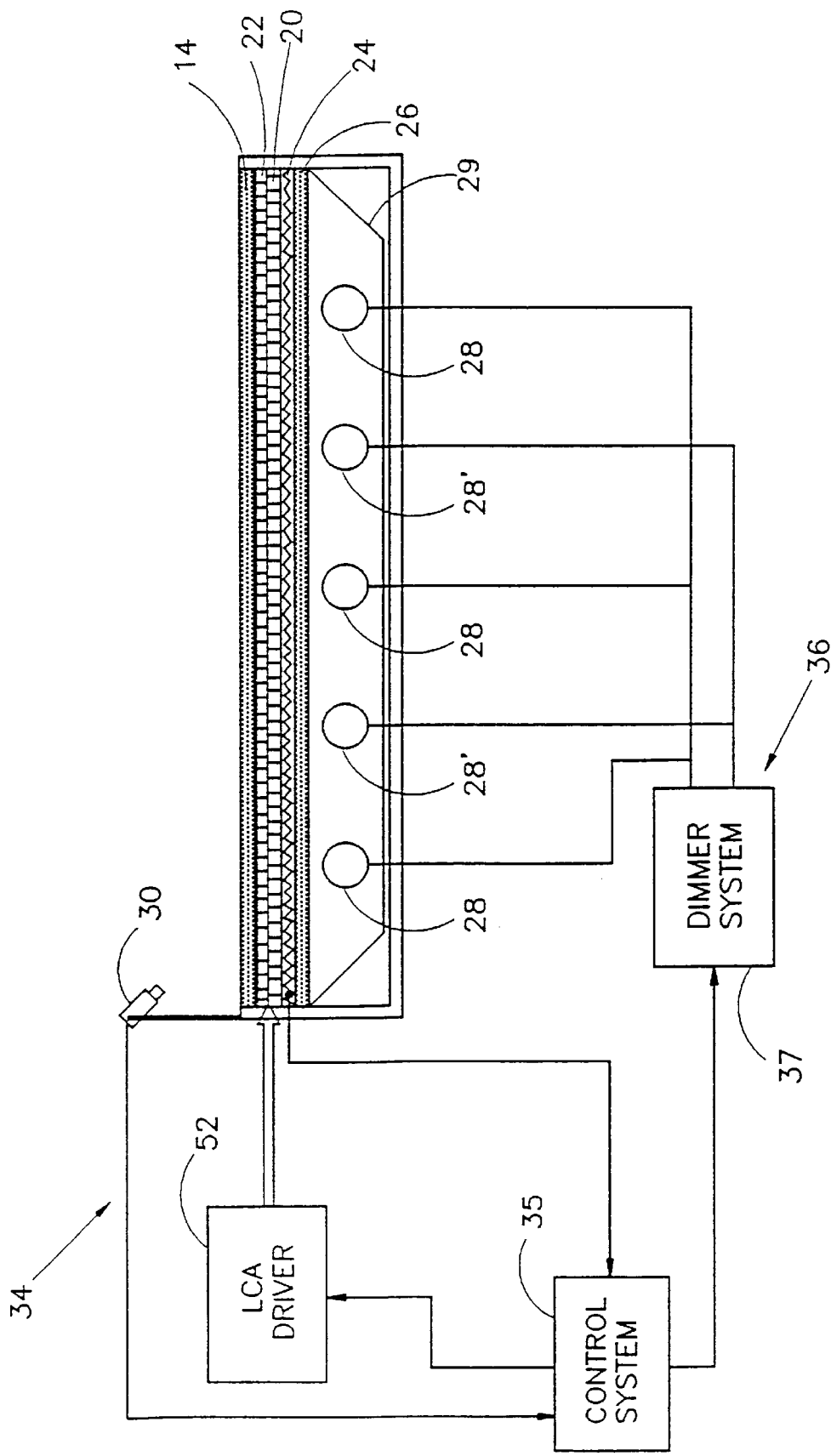
FIG. 2 is a cross-sectional illustration of the viewing apparatus of FIG. 1.

FIGS. 1 and 2 show a perspective partial cut-away illustration and a cross-sectional view of a transparency viewer 10 in accordance with a preferred embodiment of the invention. Viewer 10 comprises an opaque housing 12 which covers five sides of the viewer and a light transmitting face plate 14 covering the sixth side. One or more transparencies (films) 16 are held on faceplate 14 by slipping the transparencies under an edge 18 of housing 12. Alternatively, clips or other film holders may be provided to hold the film on the faceplate as is well known in the art. In some embodiments of the invention face plate 14 is a light diffuser.

At least one and preferably a sandwich of two Liquid Crystal Arrays (LCAs) 20 and 22 is located interior to faceplate 14. LCAs 20 and 22 are preferably passive matrix type arrays and the elements of the LCAs are arranged in rows and columns which are driven by drivers. When an element is driven by an RMS voltage above a given threshold, the element turns dark and when it is driven by a low or no voltage, the element is substantially transparent. The contrast between bright and dark areas will depend on the ratio of the voltages applied to the bright and dark elements.

A Brightness Enhancement Film (BEF) 24, such as manufactured by 3M Optical Systems, is optionally located behind the LCAs. An optional diffuser 26 is located between BEF 24 and a bank of illuminators 28, such that the light which reaches the BEF is diffused. The interior of the housing, and at least back interior surface 29, is preferably painted so as to reflect and/or diffuse and/or mix the light incident upon it from illuminators 28.

Viewer 10 also preferably includes a camera 30, preferably a CCD camera, which views faceplate 14 (and any transparencies mounted thereon). Viewer 10 also preferably includes a plurality of color sensors 32 each of which is sensitive to a different portion of the spectrum and whose operation is described infra.

Control electronics 34 and electrical supply circuitry 36 for control and powering of viewer 10 are preferably mounted on housing 12.

In a preferred embodiment of the invention, compensation is supplied for compensating for selective chromatic absorption, such as of blue light, by LCAs 20 and 22. While this absorption is only about 10–30%, the light which passes through the LCAs is not considered acceptable for use in a medical image viewer. In one preferred embodiment of the invention, the mix of phosphors in illuminators 28 is chosen to compensate for the selective absorption of the LCAS. In a second preferred embodiment of the invention, the light is filtered by coloring the glass of the illuminators, by tinting one of the diffusers in the system or by adding a filter between the light and the front of the faceplate. In a preferred embodiment of the invention, one or more of the illuminators, designated by reference numeral 28' in FIG. 2, is a compensating blue light source. In a preferred embodiment of the invention, color sensors 32 (FIG. 1) view the light passing through film 24 and feed (spectral) brightness signals which they generate to a control system 35, which controls compensating blue illuminators 28' and daylight colored illuminators 28 via a lamp dimmer system 37, to achieve a desired color balance which compensates for the selective absorption of the LCAs.

In a preferred embodiment of the invention, a novel mode for driving the LCAs is used which allows for both simplified electronics and for substantially higher contrast ratios than was believed possible in the prior art. In particular, the present inventors have noted that the geometry normally present in transparency viewers can be simplified into a two by two matrix problem. In the prior art as described above, it was believed that the maximum voltage ratio between areas of the array which were on and those which were off which could be achieved was 3:1. The present inventors have found that the problem of viewing transparencies of the geometries described above results in a particular subset of the general two by two matrix problem which allows for a higher voltage ratio and hence a higher contrast ratio between the bright and dark areas. This improved solution is possible for cases in which one of the four quadrants has essentially no voltage applied (i.e., is bright), and the other three have a voltage (i.e., are dark), which is the same for all of the quadrants, applied to them.

In a preferred embodiment of the invention, rows and columns of the LCA are each formed into two groups, a first group of rows (or columns) which contains all those rows (or columns) which have both on and off elements and a second group comprising all rows (or columns) for which all of the elements are on (i.e., non-transmitting). The rows or columns which make up the groups are not necessarily contiguous.

In a preferred embodiment of the invention, the first group of columns is driven by a signal. S, and the second group is driven by a signal $S_2$. The first group of rows is driven by a signal $S_3$ which is the same as $S_1$, and the second group of rows is driven by a signal $S_4$. Preferably each of the signals is a square wave having a relatively arbitrary period T and voltage levels of zero volts and $V_c$, the maximum allowable array voltage. $S_2$ is preferably delayed with respect to $S_1$ by a time $2T/3$ and $S_4$ is preferably delayed by $T/3$ with respect to $S_1$. This arrangement results in the "bright" areas being subjected to zero voltage and the dark areas being subjected to an alternating stepped voltage having a peak value equal to the peak value of the driver signals and an RMS value of $(2/3)^{1/2}V_c$. The driver waveforms as well as the waveforms across the elements are shown in FIG. 3.

Figure 4:
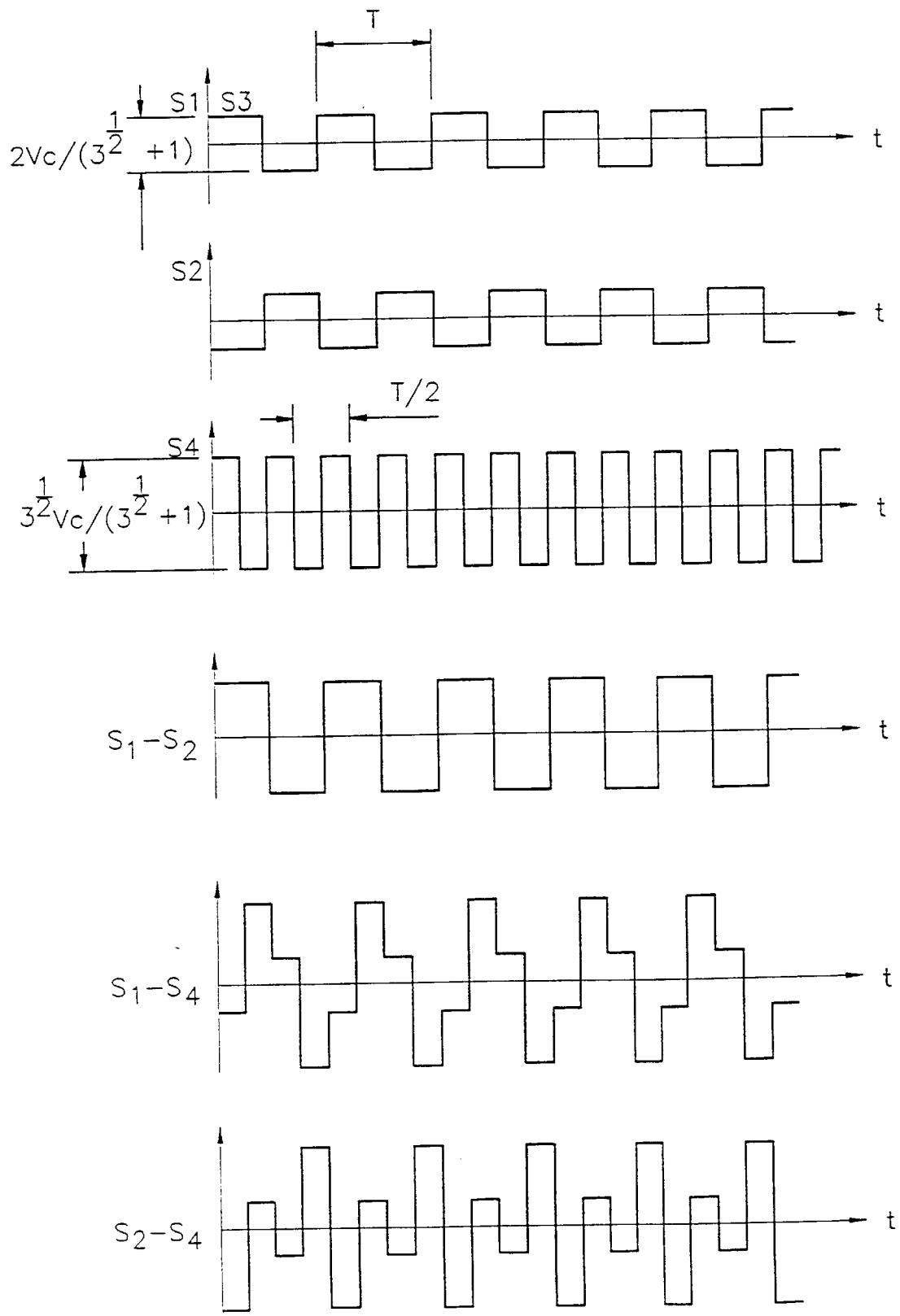
FIG. 4 shows the waveforms of voltages which are applied to groups of rows and columns and to the elements of an LCA in accordance with a second preferred embodiment of the invention.

In a second preferred embodiment of the invention three of the voltages are square waves having a period T and a peak value of $2V_c/(3^{1/2}+1)$, with $S_1$ and $S_3$ being the same and $S_2$ being delayed by T/2 with respect to the other voltages. $S_4$ can have one of three forms, in each case being a square wave having a voltage equal to $3^{1/2}V_c/(3^{1/2}+1)$. In one case the period of the square wave is T*2 M (where M is an integer). In a second case It is equal to T/2M (where M is an integer). In both these cases a rising edge of this signal coincides with either a falling or a rising edge of the signal $S_1$. In a third case the period is T, but $S_4$ is delayed by T/4 compared with $S_1$. In this second embodiment the rms voltage on the individual elements is $2V_c/(3^{1/2}+1)$. The driver waveforms as well as the waveforms across the elements for two of these systems are shown in FIGS. 4 and 5.

Figure 6:
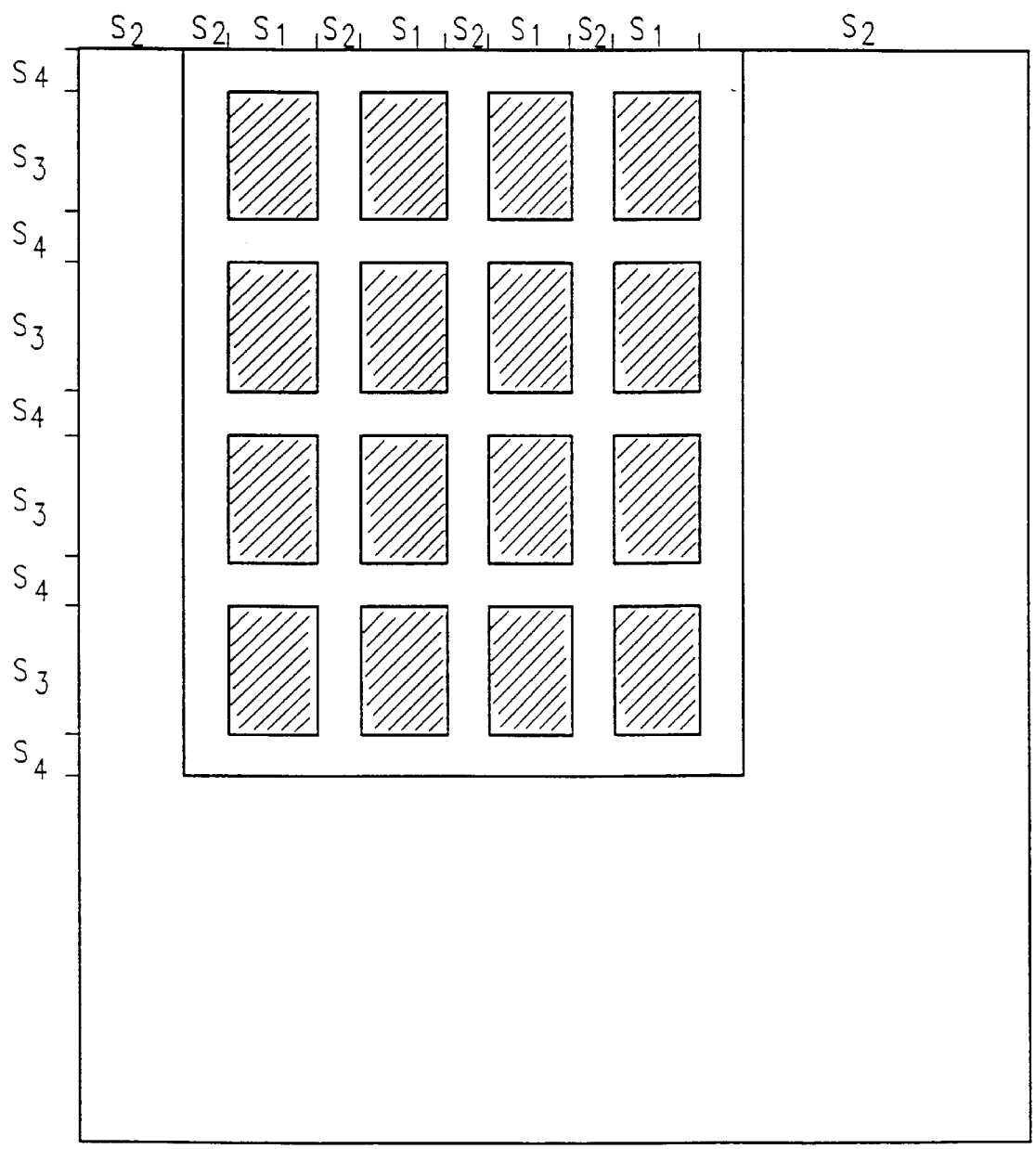
FIG. 6 illustrates a multi-imager film mounted on a viewer in accordance with the invention.

The same driving systems can be used for other configurations of dark and light areas which also represent commonly encountered configurations. One example of such a configuration is an array of nxm images on a single transparency as is normally produced to show the results of a gamma camera study or an ultrasound study. In such studies, a film is often provided with images arranged in an array, the images being separated by unexposed (clear) film. Such a configuration is shown in FIG. 6, in which image areas are shown by shading. Grouping of the rows and columns underlying the film is also shown in FIG. 6. Areas outside the film are all in the second group of rows and columns.

Several of such films can be placed side by side, which would result in a larger array of films. The only requirement for the application of this aspect of the invention is that it be possible to group the rows (columns) into two groups where all the elements of one group do not include an image and a second group where all the elements of the group have identical configurations of image and non-image areas.

Figure 7:
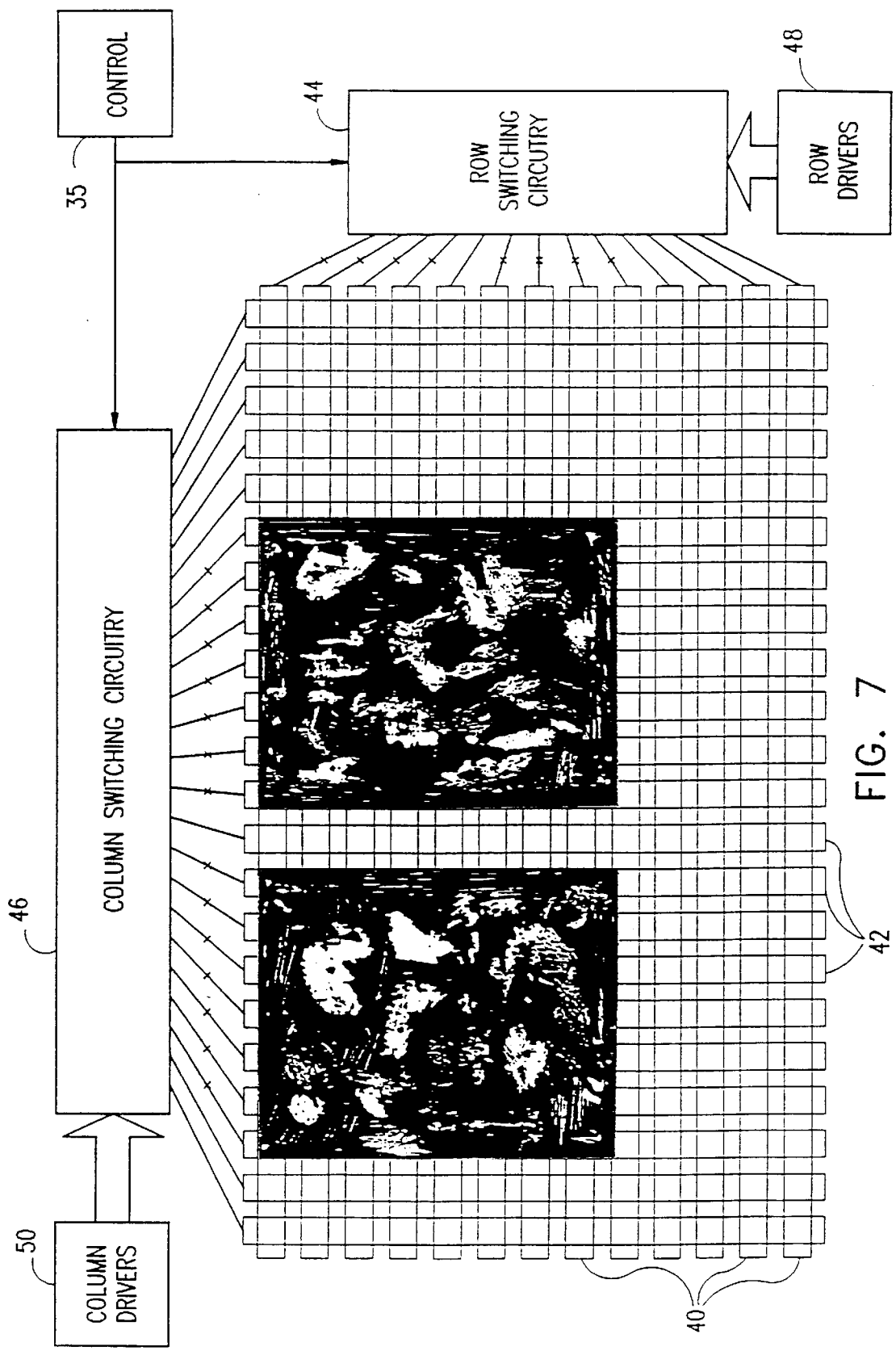
FIG. 7 is a schematic illustration of two films mounted in accordance with the invention together with a block diagram of the electronics used in carrying out the invention.

Apparatus for carrying out the driving of the LCAs is shown in FIGS. 2 and 7. FIG. 7 shows two films mounted on a faceplate. For simplicity all of the structure of the viewer is not shown except for a plurality of row and column electrodes 40 and 42. Also shown in FIG. 7 are row and column switching circuitry 44 and 46 which are controlled by a controller 35 (also shown on FIG. 2) and row and column drivers 48 and 50 which supply the drive signals $S_1$, $S_2$, $S_3$ and $S_4$ (see FIG. 6). Switching circuitry 44 and 46 and drivers 48 and 50 are referenced in FIG. 2 as LCA driver unit 52.

In operation, switching circuitry 44 and 46 switches the rows and columns to respective ones of the drivers which supply the required voltages to the row or column. In FIG. 7, rows which belong to the first group of columns (and are driven by $S_1$) are indicated by an X as are those in the first group of rows (which are driven by $S_3$). The unmarked columns and rows are driven by $S_2$ and $S_4$, respectively.

Figure 8:
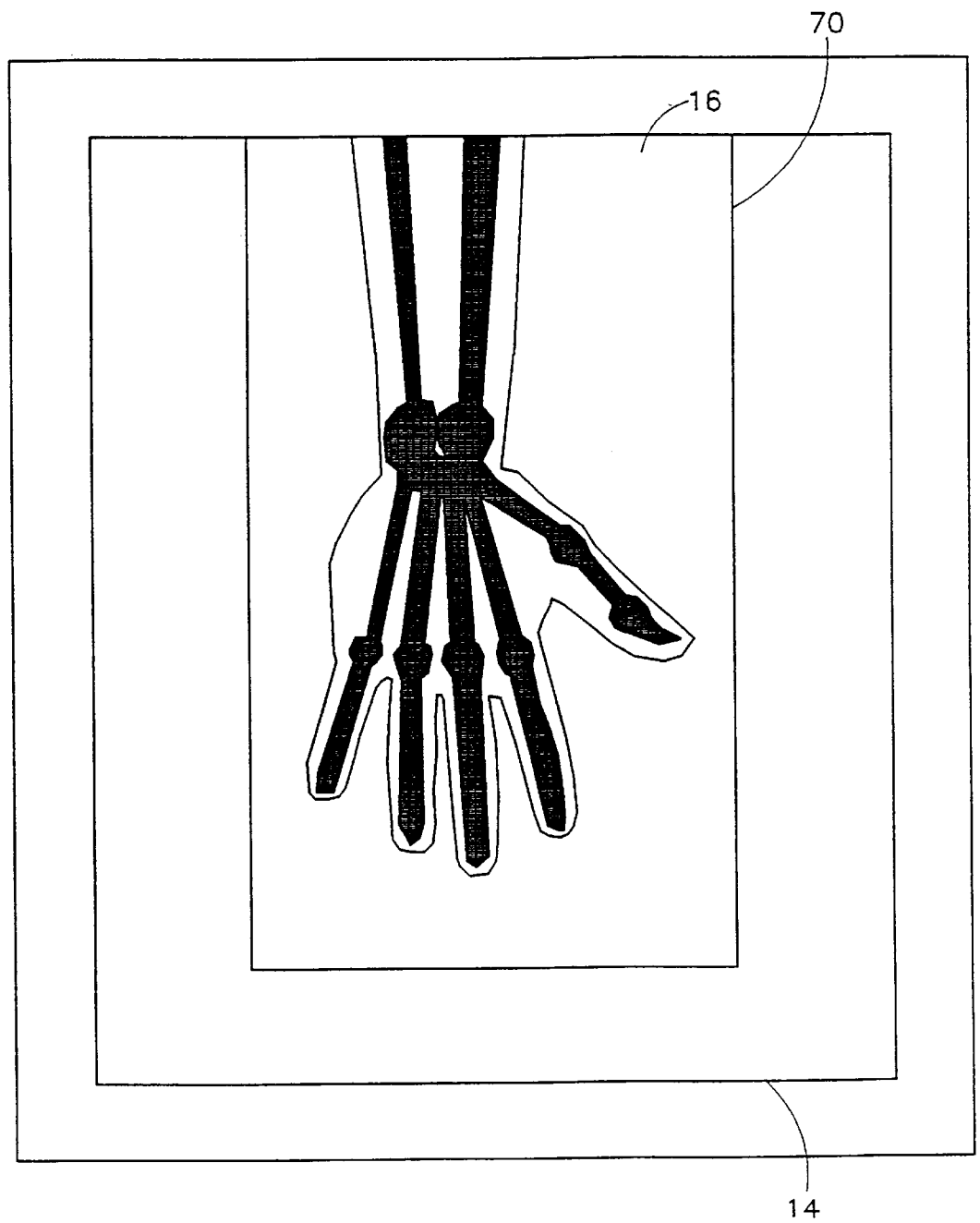
FIG. 8 illustrates a medical image film mounted on a viewer faceplate.

In general, films have overexposed borders as for example shown in a reversal X-Ray of a hand shown schematically in FIG. 8, in which the edge of the film is indicated by line 70. In order to reduce the amount of glare to which the viewer is subjected, the extent of the image area on the film which is illuminated should be minimized. This area, which has an extent equal to the extent of the image on the film, is determined in any one of a number of ways which are well known in the art; as, for example, those described in WO 91/10152 and WO 93/01564, the disclosures of which are incorporated herein by reference, and by edge detection algorithms.

Once the maximum horizontal and vertical extent of the image is determined, a rectangular region of interest is determined. Those columns and rows which include part of the image are grouped in groups $S_1$ or $S_3$ and the others are grouped in groups $S_2$ or $S_4$.

In a preferred embodiment of the invention, camera 30 is used to determine the extent of the image portion of film 16. As shown in FIG. 1, camera 30 is preferably positioned to receive light from the side lobe of BEF 24 when all the LCA elements are nominally turned off. As described above, almost no light passes the LCA in the normal (viewer) direction. However, due to the reduced contrast of the LCA at large angles and the high sensitivity of the camera, enough light from the sidelobe of BEF 24 passes through the LCA to enable the camera to form an image of the front face of viewer 10. Control 34, which receives the image, then analyzes the image either by determining the contour of the image using conventional image processing techniques or by scanning rows and columns of image pixels to determine the extent by a simple thresholding scheme.

Figure 9:
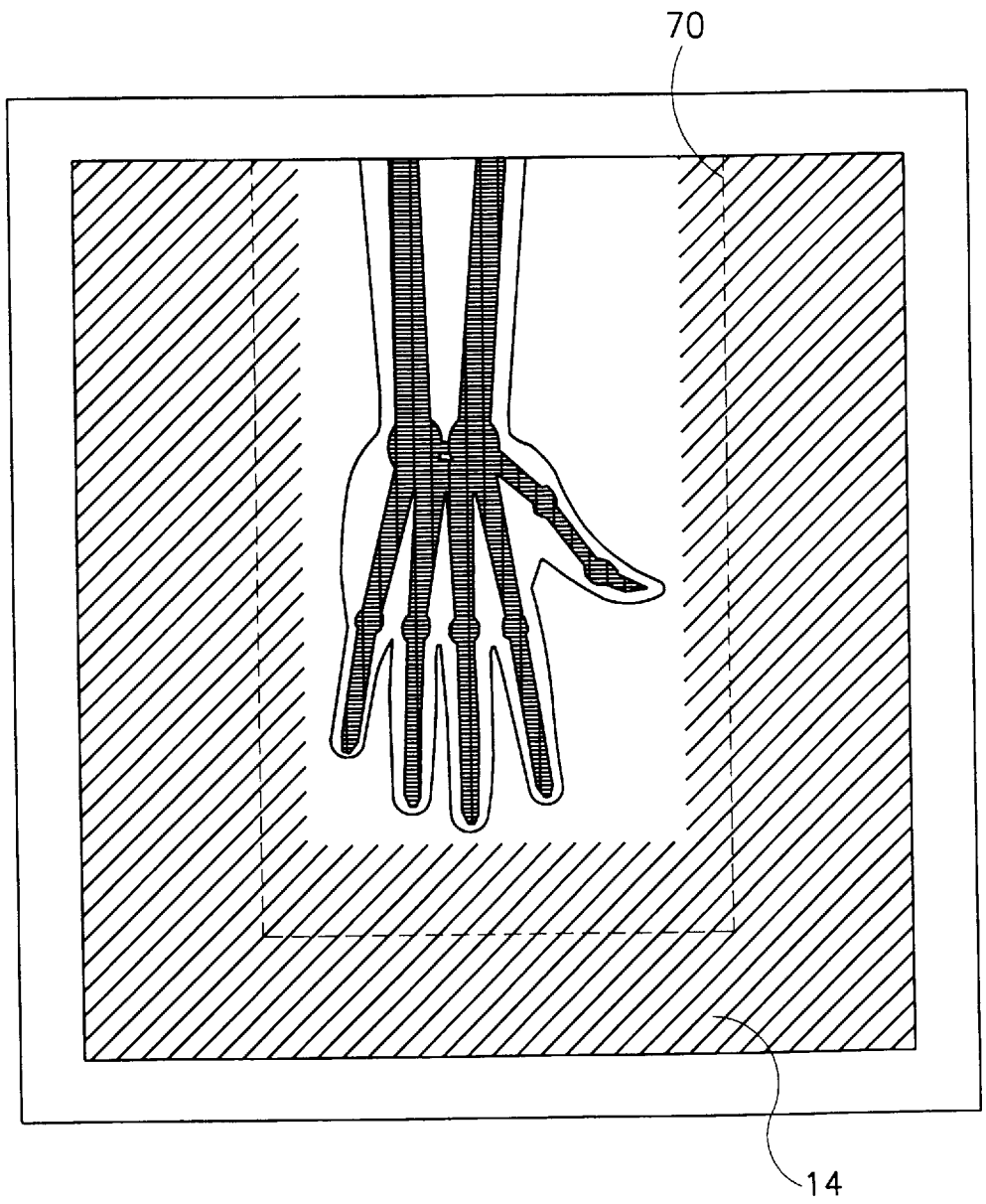
FIG. 9 illustrates masking of the image portion or the film of FIG. 8 in accordance with a preferred embodiment of the invention.

In any event, once the extent of the image is known, the grouping described above results in masking of the image portion as shown in FIG. 9, in which the dark portions of the LCA are indicated by shading.

Figure 10A:
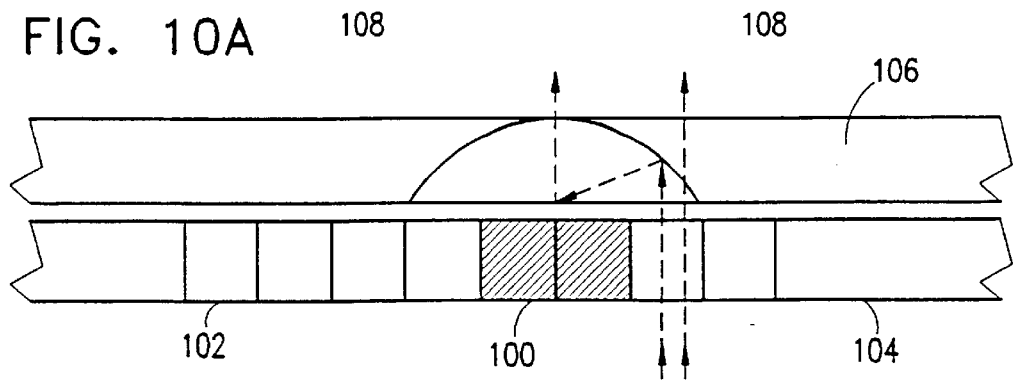
FIGS. 10A–10D show various methods of reducing the effect of seams between LCAs.
Figure 10B:
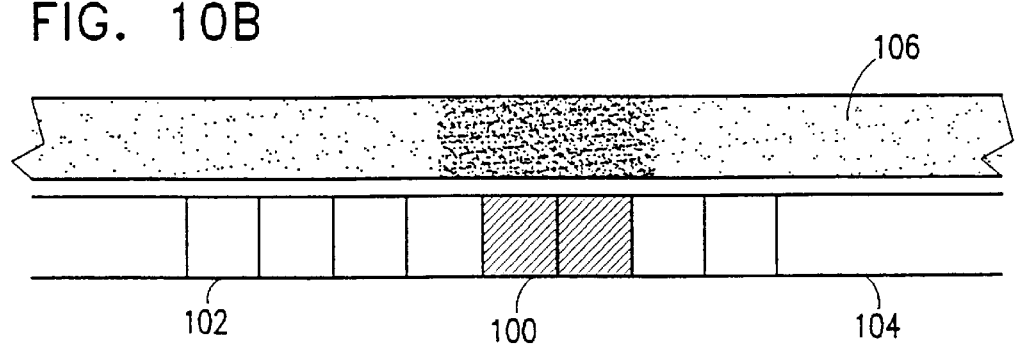
Figure 10C:
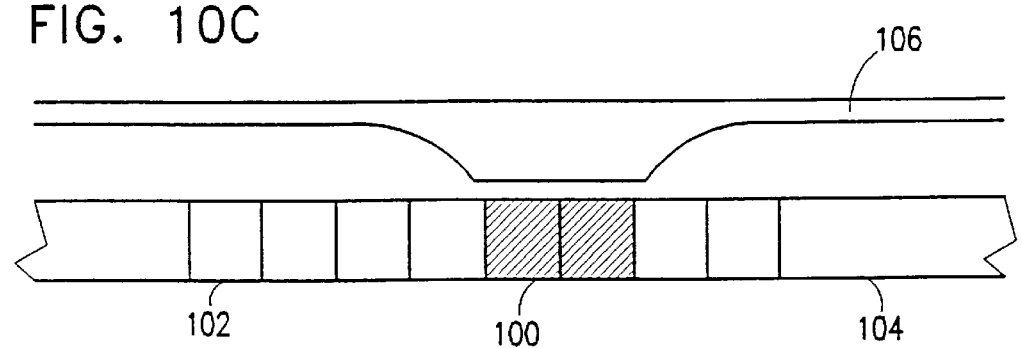
Figure 10D:
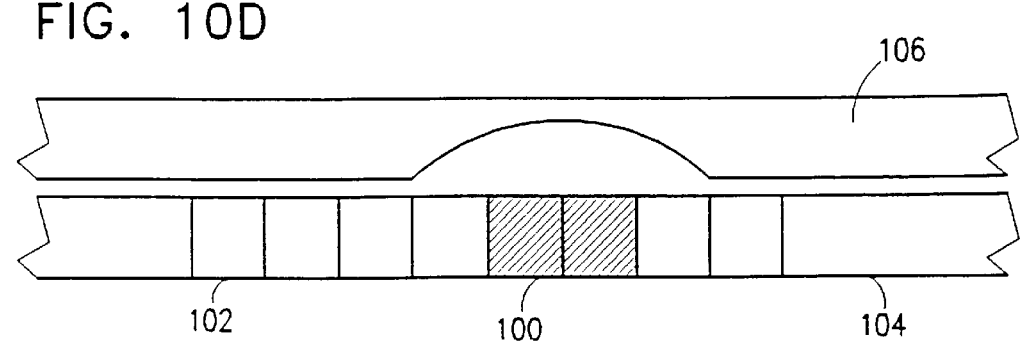

FIGS. 10A–10D show several methods of reducing the edge effects where two LCAs are laterally joined. FIGS. 10A–10D each show a joint 100 between a first LCA 102 and a second LCA 104. A diffuser plate 106 is spaced from the LCAs and is located between the LCAs and the viewer. In a preferred embodiment of the invention, diffuser plate 106 may be the faceplate of the viewer. In FIG. 10A partially reflecting surfaces 108 are embedded in the diffuser. These reflecting surfaces increase the amount of light which appears to come from the joint and effectively hide the joint. FIG, 10E schematically shows a diffuse- in which the diffusing effect is increased in the region of the joint. Again, the effect of the joint is reduced. FIG, 10C shows a diffuser having increased thickness at the joint which also increases the diffusion thereat, and FIG, 10D shows an increased air gap at the joint, which the present inventors have found also increases the diffusion.

The joints shown in FIGS. 10A–10D are butt joints. However, lap joints can also be used in which case the width of the joint is reduced, but the surface of the LCA is no longer flat. Finally, FIGS. 10A–10D show a single layer of LCA. As indicated above, in a preferred embodiment of the invention, preferably two layers are used for the LCA, and the layers are preferably offset by a fraction of the element of the array to improve the contrast of the array.

It should be understood that the solutions for seams at joints which have been described are generally suitable only for medical imaging viewers, and not for normal applications in which diffusing light over the seam would be objectionable.

The invention has been described with respect to a viewer which has a single LCA across its entire width. In general, especially for larger viewers, multiple LCAs (preferably each having a double layer) would be used side by side. In a preferred embodiment of the invention, separate driver units would be used for each of the side-by-side LCAS.

We claim:

1. A transparency viewing device comprising:
    a faceplate adapted for mounting at least one transparency thereon;
    an LCD array having a given chromaticity underlying the faceplate;
    a source of backlighting for the LCD array having a variable chromaticity; and a controller which controls the chromaticity of the backlighting source based on the chromaticity of the light passing through the film and the LCD array.

2. A transparency viewing device according to claim 1 and comprising:

a sensor which views the faceplate and the transparency thereon and generates a chromaticity signal based on the light which passes through the LCD array and the film, wherein the controller controls the chromaticity of the backlighting source responsive to the chromaticity signal.

3. A transparency viewing device according to claim 1 wherein the source of backlighting comprises a plurality of lighting sources having different chromaticities and wherein the controller controls the chromaticity by varying the relative intensities of the lighting sources having different chromaticities.

4. A transparency viewing device according to claim 2 wherein the source of backlighting comprises a plurality of lighting sources having different chromaticities and wherein the controller controls the chromaticity by varying the relative intensities of the lighting sources having different chromaticities.

5. A transparency viewing device according to claim 1 wherein the LCD array defines an array of pixels, wherein the LCD is substantially effective to block light within a relatively limited range of angles around the normal to the LCD in a light blocking mode and is relatively ineffective to block light reaching it from angles outside the limited range of angles and further comprising:

a light detector which views the array from an angle outside the range of angles at which the LCD is substantially effective to block the light in the light blocking mode.

6. A transparency viewing device according to claim 5 wherein the source of backlighting comprises:

a light source; and a brightness enhancing, BE, device situated between the light source and the LCD array, which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles relatively far from the normal at which the LCD is not effective to block the light.

7. A transparency viewing device according to claim 5 in which the detector is a camera.

8. A transparency viewing device according to claim 6 in which the detector is a camera.

9. A transparency viewing device according to claim 2 wherein the LCD array defines an array of pixels, wherein the LCD is substantially effective to effectively block light within a relatively limited range of angles around the normal to the LCD in a light blocking mode and is relatively ineffective to block light reaching it from angles outside the limited range of angles and further comprising:

a light detector which views the array from an angle outside the range of angles at which the LCD is substantially effective to block the light in the light blocking mode.

10. A transparency viewing device according to claim 9 wherein the source of backlighting comprises:

a light source; and a brightness enhancing, BE, device situated between the light source and the LCD array, which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles relatively far from the normal at which the LCD is not effective to block the light.

11. A transparency viewing device according to claim 9 in which the detector is a camera.

12. A transparency viewing device according to claim 3 wherein the LCD array defines an array of pixels, wherein the LCD is substantially effective to effectively block light within a relatively limited range of angles around the normal to the LCD in a light blocking mode and is relatively ineffective to block light reaching it from angles outside the limited range of angles and further comprising:

a light detector which views the array from an angle outside the range of angles at which the LCD is substantially effective to block the light in the light blocking mode.

13. A transparency viewing device according to claim 12 wherein the source of backlighting comprises:

a light source; and a brightness enhancing, BE, device situated between the light source and the LCD array, which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles relatively far from the normal at which the LCD is not effective to block the light.

14. A transparency viewing device according to claim 12 in which the detector is a camera.

15. A transparency viewing device according to claim 4 wherein the LCD array defines an array of pixels, wherein the LCD is substantially effective to effectively block light within a relatively limited range of angles around the normal to the LCD in a light blocking mode and is relatively ineffective to block light reaching it from angles outside the limited range of angles and further comprising:

a light detector which views the array from an angle outside the range of angles at which the LCD is substantially effective to block the light in the light blocking mode.

16. A transparency viewing device according to claim 15 wherein the source of backlighting comprises:

a light source; and a brightness enhancing, BE, device situated between the light source and the LCD array, which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles relatively far from the normal at which the LCD is not effective to block the light.

17. A transparency viewing device according to claim 15 in which the detector is a camera.

18. A transparency viewing device according to claim 1 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies a plurality of row electrodes which drive identical patterns of pixels, and which identically electrifies a plurality of column electrodes which drive identical patterns of pixels, wherein each of said patterns of pixels includes at least one pixel which is to be activated and wherein at least some of the plurality of row electrodes and some of the plurality of column electrodes are not contiguous.

19. A transparency viewing device according to claim 1 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies, using a non-scanning mode, those row electrodes which drive identical patterns of pixels, and which identically electrifies, using a non-scanning mode, those column electrodes which drive identical patterns of pixels.

20. A transparency viewing device according to claim 1 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies at least one row electrode and one at least one column electrode resulting in an effective null RMS voltage across at least one pixel element.

21. A transparency viewing device according to claim 2 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies a plurality of row electrodes which drive identical patterns of pixels, and which identically electrifies a plurality of column electrodes which drive identical patterns of pixels, wherein each of said patterns of pixels includes at least one pixel which is to be activated and wherein at least some of the plurality of row electrodes and some of the plurality of column electrodes are not contiguous.

22. A transparency viewing device according to claim 2 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies, using a non-scanning mode, those row electrodes which drive identical patterns of pixels, and which identically electrifies, using a non-scanning mode, those column electrodes which drive identical patterns of pixels.

23. A transparency viewing device according to claim 2 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies at least one row electrode and one at least one column electrode resulting in an effective null RMS voltage across at least one pixel element.

24. A transparency viewing device according to claim 3 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies a plurality of row electrodes which drive identical patterns of pixels, and which identically electrifies a plurality of column electrodes which drive identical patterns of pixels, wherein each of said patterns of pixels includes at least one pixel which is to be activated and wherein at least some of the plurality of row electrodes and some of the plurality of column electrodes are not contiguous.

25. A transparency viewing device according to claim 3 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies, using a non-scanning mode, those row electrodes which drive identical patterns of pixels, and which identically electrifies, using a non-scanning mode, those column electrodes which drive identical patterns of pixels.

26. A transparency viewing device according to claim 3 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies at least one row electrode and one at least one column electrode resulting in an effective null RMS voltage across at least one pixel element.

27. A transparency viewing device according to claim 4 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies a plurality of row electrodes which drive identical patterns of pixels, and which identically electrifies a plurality of column electrodes which drive identical patterns of pixels, wherein each of said patterns of pixels includes at least one pixel which is to be activated and wherein at least some of the plurality of row electrodes and some of the plurality of column electrodes are not contiguous.

28. A transparency viewing device according to claim 4 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies, using a non-scanning mode, those row electrodes which drive identical patterns of pixels, and which identically electrifies, using a non-scanning mode, those column electrodes which drive identical patterns of pixels.

29. A transparency viewing device according to claim 4 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies at least one row electrode and one at least one column electrode resulting in an effective null RMS voltage across at least one pixel element.

30. A transparency viewing device according to claim 5 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and wherein the driver identically electrifies a plurality of row electrodes which drive identical patterns of pixels, and identically electrifies a plurality of column electrodes which drive identical patterns of pixels, wherein each of said patterns of pixels includes at least one pixel which is to be activated and wherein at least some of the plurality of row electrodes and some of the plurality of column electrodes are not contiguous.

31. A transparency viewing device according to claim 5 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and wherein the driver identically electrifies, using a non-scanning mode, those row electrodes which drive identical patterns of pixels, and identically electrifies, using a non-scanning mode, those column electrodes which drive identical patterns of pixels.

32. A transparency viewing device according to claim 5 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and wherein the driver identically electrifies at least one row electrode and one at least one column electrode resulting in an effective null RMS voltage across at least one pixel element.

33. A transparency viewing device according to claim 6 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and wherein the driver identically electrifies a plurality of row electrodes which drive identical patterns of pixels, and identically electrifies a plurality of column electrodes which drive identical patterns of pixels, wherein each of said patterns of pixels includes at least one pixel which is to be activated and wherein at least some of the plurality of row electrodes and some of the plurality of column electrodes are not contiguous.

34. A transparency viewing device according to claim 6 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and wherein the driver identically electrifies, using a non-scanning mode, those row electrodes which drive identical patterns of pixels, and identically electrifies, using a non-scanning mode, those column electrodes which drive identical patterns of pixels.

35. A transparency viewing device according to claim 6 wherein the LCD array comprises:

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and wherein the driver identically electrifies at least one row electrode and one at least one column electrode resulting in an effective null RMS voltage across at least one pixel element.

36. A transparency viewing device in accordance with claim 5 wherein the light detector acquires an image of the faceplate with the LCD array in a light blocking mode and including a processor which determines the extent of a transparency mounted on the viewing surface from said image.

37. A transparency viewing device in accordance with claim 5 wherein the light detector acquires an image of the faceplate with the LCD array in a light blocking mode and including a processor which determines the extent of an image on a transparency mounted on the viewing surface from said image.

38. A transparency viewing device in accordance with claim 9 wherein the light detector acquires an image of the faceplate with the LCD array in a light blocking mode and including a processor which determines the extent of a transparency mounted on the viewing surface from said image.

39. A transparency viewing device in accordance with claim 9 wherein the light detector acquires an image of the faceplate with the LCD array in a light blocking mode and including a processor which determines the extent of an image on a transparency mounted on the viewing surface from said image.

40. A transparency viewing device in accordance with claim 12 wherein the light detector acquires an image of the faceplate with the LCD array in a light blocking mode and including a processor which determines the extent of a transparency mounted on the viewing surface from said image.

41. A transparency viewing device in accordance with claim 12 wherein the light detector acquires an image of the faceplate with the LCD array in a light blocking mode and including a processor which determines the extent of an image on a transparency mounted on the viewing surface from said image.

42. A transparency viewing device in accordance with claim 15 wherein the light detector acquires an image of the faceplate with the LCD array in a light blocking mode and including a processor which determines the extent of a transparency mounted on the viewing surface from said image.

43. A transparency viewing device in accordance with claim 15 wherein the light detector acquires an image of the faceplate with the LCD array in a light blocking mode and including a processor which determines the extent of an image on a transparency mounted on the viewing surface from said image.

44. A method of viewing a transparency comprising:

backlighting an LCD array on which a transparancy is to be mounted, for viewing with a source of backlighting having a variable chromaticity; and controling the chromaticity of the backlighting source based on the chromaticity of the LCD array and the transparancy.

\* \* \* \* \*